B. E. MILES.
Grain-Shovel.
No. 43,519. Patented July 12 1864
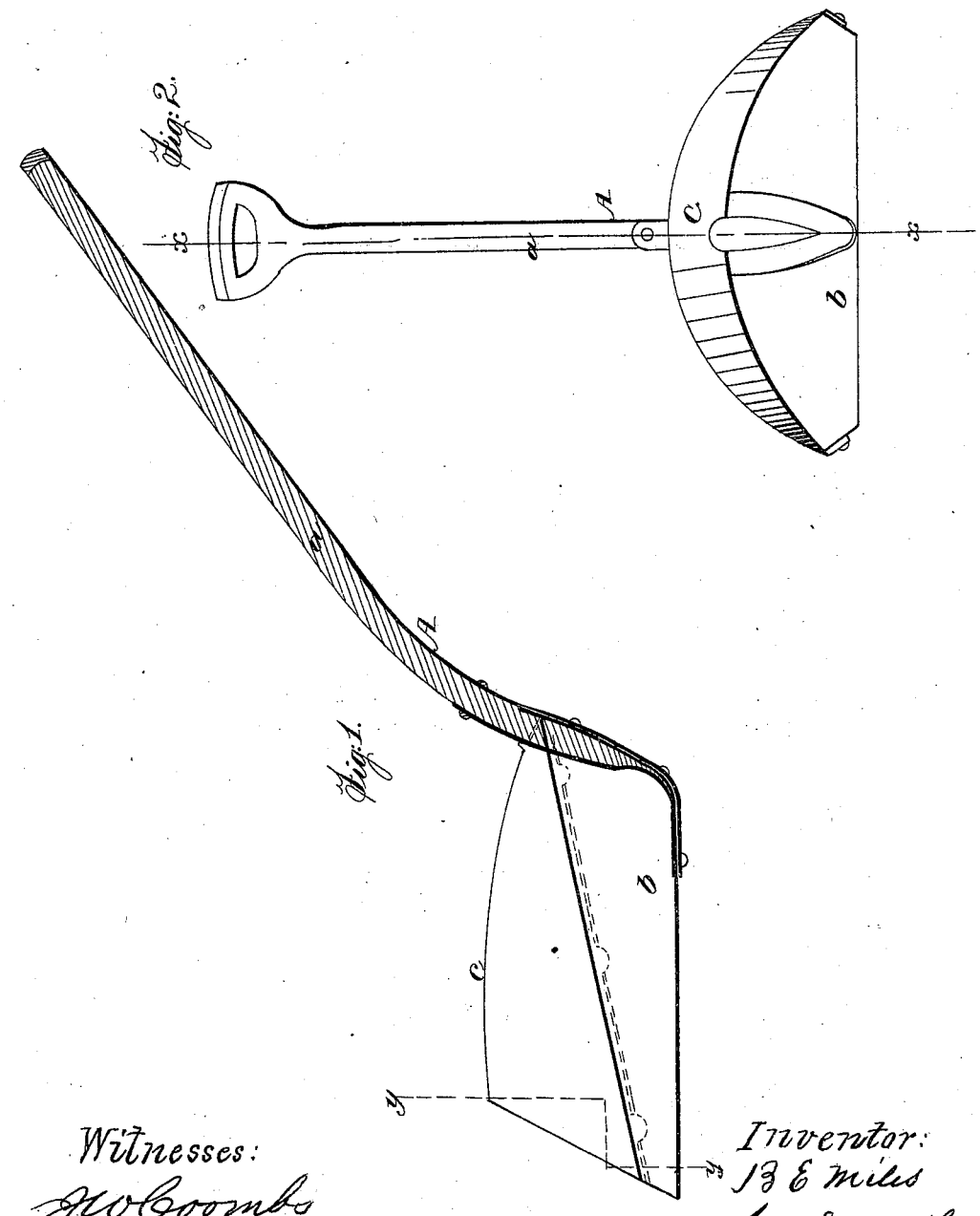
Witnesses:
H O Coombs
Henry Morris
Inventor:
B E Miles

UNITED STATES PATENT OFFICE.

B. E. MILES, OF WASHINGTON, ILLINOIS.

IMPROVEMENT IN GRAIN-SHOVELS.

Specification forming part of Letters Patent No. 43,519, dated July 12, 1864.

*To all whom it may concern:*

Be it known that I, B. E. MILES, of Washington, in the county of Tazewell and State of Illinois, have invented a new and Improved Grain-Shovel; and I do hereby declare that the following is a full, clear, and exact description of the same, reference being had to the accompanying drawings, making a part of this specification, in which—

Figure 1 is a side sectional view of my invention, taken in the line $x\,x$, Fig. 2; Fig. 2, a front sectional view of the same, taken in the line $y\,y$, Fig. 1.

Similar letters of reference indicate corresponding parts in the two figures.

This invention relates to a new and useful improvement in shovels for shoveling grain; and it consists in providing a shovel of this description with a cover or top plate so arranged as to prevent the grain falling from the shovel while the latter is in use. The ordinary shovels will hold a considerable quantity of grain—that is to say, a large quantity may be taken up on them, but a large amount will drop off in the act of throwing it from the shovels, and hence the work of shoveling grain from one place to another is not only much retarded, but in many cases—as in shoveling grain from wagons, for instance—considerable waste ensues—a difficulty fully obviated by my improvement.

To enable those skilled in the art to fully understand and construct my invention, I will proceed to describe it.

A represents a grain-shovel, which may be constructed in the usual way, $a$ being the handle, and $b$ the scoop portion. The scoop $b$ is provided with a top or cover, $c$, which is of curved form, it being convex at its outer or upper surface, as shown clearly in Fig. 2. This top or cover extends from the back end of the scoop to within a short distance of its front end. The sides of the top or cover extend to the front end of the scoop, but it is slightly inclined, so that the center of the front end of the former is a little back of the front end of the scoop, as shown in Fig. 1. By this means it will be seen that the capacity of the shovel will be considerably increased—about one-third—and at the same time the shovel is made to retain its load until the latter is discharged by the usual pitch or throw of the operator. The application of this top or cover to the shovel involves but little additional expense, while the saving in time and the prevention of the waste of grain in shoveling the same will amount to a large item in a short period of time.

Having thus described my invention, I claim as new and desire to secure by Letters Patent as an improved article of manufacture—

A grain-shovel provided with a top or cover, substantially as and for the purpose herein set forth.

B. E. MILES.

Witnesses:
JAMES R. CRANE,
PETER FIEFEE.